May 6, 1958 W. H. MEAD ET AL 2,833,407
SEPARATOR AND RECLAIMER
Filed Feb. 18, 1955 2 Sheets-Sheet 2
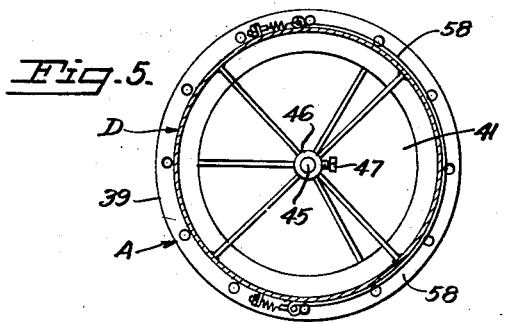
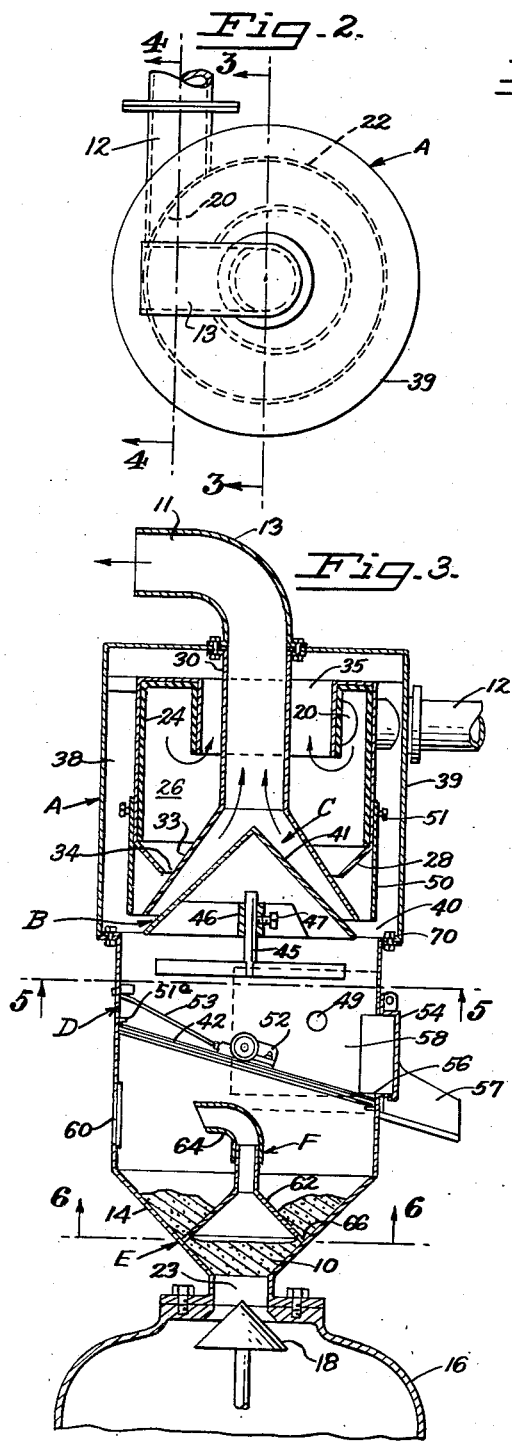
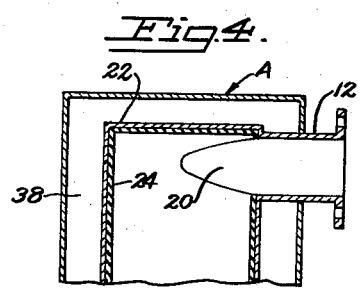
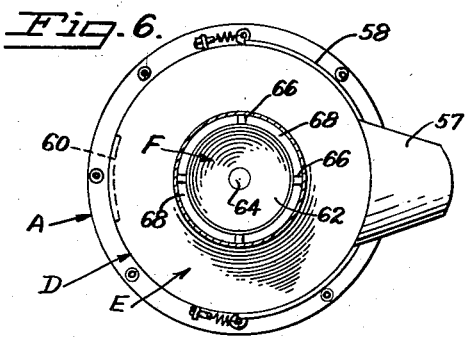
INVENTORS
WILLIAM H. MEAD
ARTHUR A. ZAMBRUNO
ALEXANDER L. JETT
BY
ATTORNEY

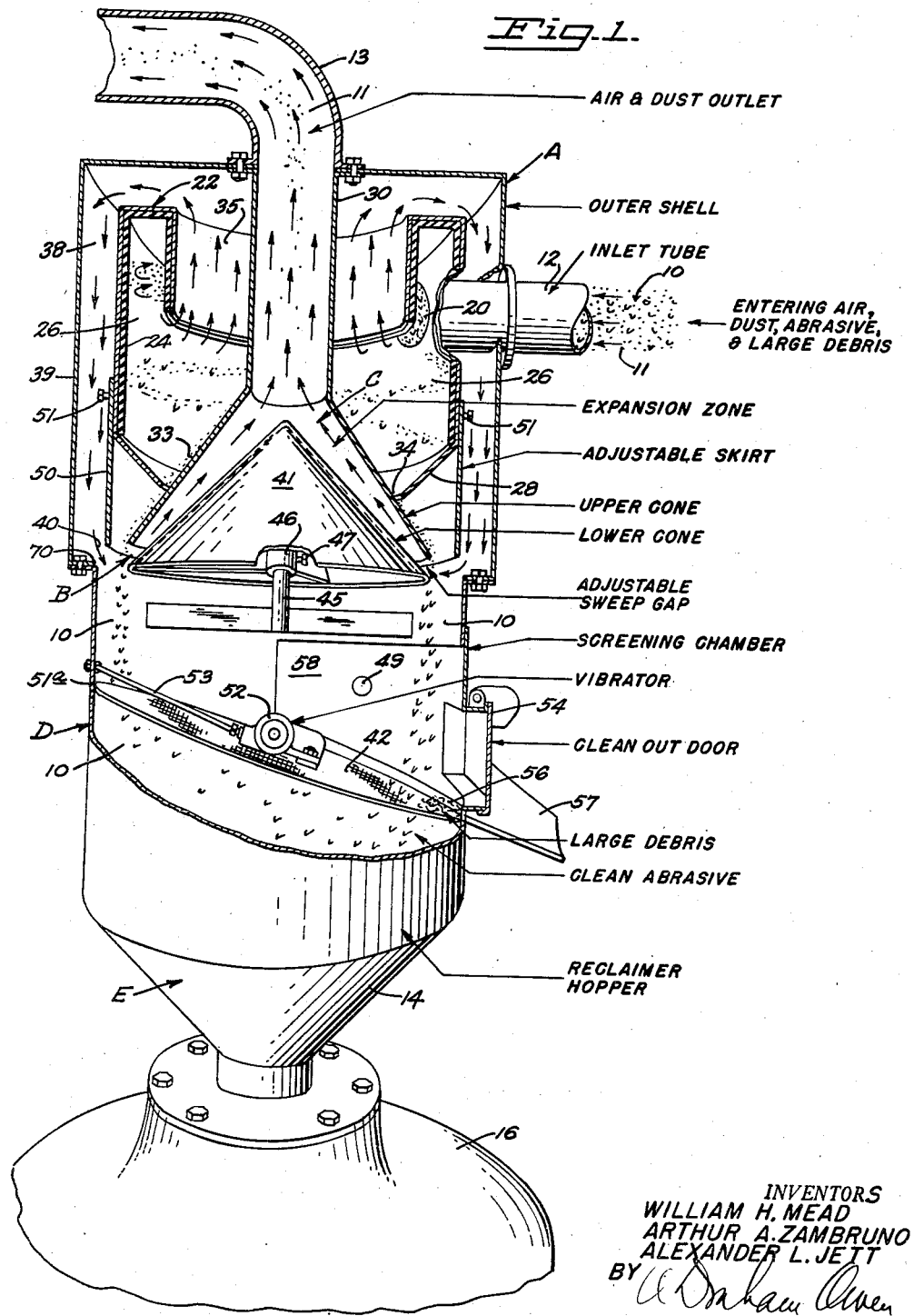

United States Patent Office 2,833,407
Patented May 6, 1958

2,833,407

SEPARATOR AND RECLAIMER

William H. Mead, Oakland, Arthur A. Zambruno, San Mateo, and Alexander L. Jett, Menlo Park, Calif., assignors, by mesne assignments, to said Mead Application February 18, 1955, Serial No. 489,127

15 Claims. (Cl. 209—30)

This invention relates to an apparatus for separating into its components a continuously circulating mixture of two or more granular or comminuted materials, some of which have different specific gravities, as well as physical size. It also relates to separating two or more components of material being conveyed in an air stream in which there is no loss of vacuum or pressure of the air conveying the components.

It is contemplated that this invention will prove particularly useful in connection with a surface treating apparatus of the kind described in copending application Serial Number 420,254 filed April 1, 1954, now Patent No. 2,770,924 for this present invention makes it possible to separate and to reclaim in a continuous operation the valuable abrasive or treating material from the worthless refuse or dust which is drawn off with it from the surface being treated.

The surface treating apparatus to which we refer draws off the mixture of treating material and waste in a powerful suction current after the blasted abrasive or grit has impinged at the work surface. One problem which arises in connection with its use, is that of providing a grit reclaimer which will work under extreme low-pressure conditions or conversely under pressure conditions. Another problem is that of providing a reclaimer which will work quickly and continuously, so that it can be used to keep the machine supplied with plenty of treating material without periodic shutdowns. Another problem is that of removing the fines from reclaimed grit so that wear in the grit hoses and nozzles is considerably reduced. Another practical problem is to provide a reclaimer which can be regulated to suit the many different kinds of abrasive and waste encountered. One further problem is to provide a grit reclaimer which is capable of operating under a vacuum while delivering reclaimed grit into an area of positive pressure.

One important object of the invention is to provide a reclaimer that is so efficient in removing fines created in the last blasting that these wear-producing particles will be removed before they can again pass along the blast hose and through the nozzle, where high velocities exist.

Another object of the invention is to provide a grit reclaimer which will operate in a continuous cycle under very low pressure or vacuum conditions when separating two solid materials, e. g., grit from refuse and fines.

Another object of our invention is to provide a grit reclaimer which employs as a separating agent the same suction current which is used to convey the material into the separator.

Another object of this invention is to provide a method and apparatus by which a mixture of granular or comminuted materials, one or several of which are heavier than the others, can be separated into its components.

Another object of the invention is to provide a separating device which can be adjusted for use with different materials or different sized particles of the same materials.

Another object of our invention is to provide a grit reclaimer with a grit inlet or outlet that will function properly whether it opens into a vacuum or into positive pressure.

Another object of this invention is to provide an apparatus capable of separating two intermixed fine-particle materials of different specific gravity.

Another object of the invention is to provide a grit reclaimer which will prevent contamination of the grit with the refuse or fines.

Other objects and advantages of the invention will appear from the following description and from the drawings. Although the apparatus is described as a grit reclaimer, it should be understood that "grit" includes all abrasives—metal, grit, shot, sand, rice hulls, walnut shells, and other treating materials as well, and also that the method is applicable to separate any relatively heavy material from other relatively light materials.

In the drawings:

Fig. 1 is a view perspective, partly in section, of a reclaimer embodying our invention.

Fig. 2 is a view in top plan of the device of Fig. 1.

Fig. 3 is a view in vertical section along the line 3—3 of Fig. 2.

Fig. 4 is a similar view of a top portion of the device along the line 4—4 of Fig. 2.

Fig. 5 is a view in horizontal section along the line 5—5 of Fig. 3.

Fig. 6 is a view in horizontal section along the line 6—6 of Fig. 3, with the grit removed for the sake of clarity.

Broadly considered, our invention is directed to a method and apparatus for separating and reclaiming spent grit from an intermixture of the grit with air, dust, scale and other contaminants returning from an abrasive treating area. The apparatus includes a cylindrically walled tank which has an upper chamber A with a novel system of baffles and passageways which are particularly effective in separating the air and entrained solid materials into two separate streams. The solid materials spun out of the air stream are stratified on a conical slide into a layer of substantially one particle thickness. The separated air meanwhile is redirected into a cross current of air, sweeping the layer of solid materials, at a sweep area B, as it cascades over the perimeter of the slide.

An adjustable lower cone or baffle means cooperates with the slide to maintain a uniform velocity of cross current air throughout the sweep area. By properly regulating the sweep gap at the sweep area B substantially all the contaminants may be swept from the falling grit into the space between the two cones. An expansion zone C is provided between the two cones so that any grit particles accidentally removed with the contaminants will fall out of the decelerating air stream and slide back to the sweep area B. At the same time the lighter contaminants are carried upwardly by the air stream to an exhaust outlet in the top of the tank. From the sweep area B the heavier grit falls into a screening chamber D below. There, over-sized waste particles are removed, and properly sized grit is delivered from the screen to a grit hopper E for reuse.

Referring to the drawings in detail, 10 indicates particles of grit intermixed with particles of dust, scale, debris, and other contaminants 11 returning in conduit 12 from a surface treating area. Such contaminants may include rust, sawdust, paint, varnish, dirt or any other unwanted coating being removed from the surface. The flow of materials is induced by a powerful air pump (not shown) exerting a suction force through the conduit 13, chamber A of the grit reclaimer, and the conduit 12 which is connected to the operating head of the surface treating apparatus. For the purposes of illustration, vacuum operation will be dealt with such as that described in the above mentioned application, Serial No. 420,254. However, this is not intended to mean any relinquishment of the scope of interpretation of the invention, as operation under positive pressure is also contemplated.

The illustrated apparatus is used in the suction circuit, under the low pressure conditions prevailing there, to separate the grit 10 from the waste 11 in a continuous cycle. It feeds grit to the hopper E, and passes the waste 11 out through the conduit 13 to a refuse collector which is not shown here. The reclaimed grit 10 can be used over and over again, and there is no need to stop the surface treating operation for a new supply of grit until the old supply is completely expended, by attrition.

The grit 10 is transferred from the hopper 14 to the air blasting circuit of the surface treating apparatus (not shown) through an equalizer tank 16. The function of the equalizer tank is to permit a transfer of grit from the low pressure of the reclaimer to the positive pressure of the air blast supply line. A dump valve 18 at the bottom of the hopper 14 remains closed while the equalizer tank is under pressure greater than atmospheric and the reclaimer under a vacuum condition. It opens when the air pressure in the equalizer tank 16 is reduced. Details of the dump valve 18 need not be described here, as it is fully described in U. S. Reissue Patent No. 23,186.

In the reclaimer, the mixture of grit 10 and waste material 11 enters through the conduit 12 and is directed by the tangential inlet 20 in a circular path within the cyclone 22. The cyclone 22 is formed as two concentric cylinders closed at the top and preferably lined with a layer 24 of rubber or other resilient material to reduce abrasive action. This lining 24 greatly increases the useful life of the inlet chamber 26. Centrifugal force generated by the circular motion within the cyclone 22 accomplishes an initial separation of the grit and waste material from the air stream so that the intermixed solids spin down the inside of the cyclone to a deflecting baffle 28.

Spaced a slight distance below the baffle 28 is a large conical slide 33. The slide 33 is supported from the bottom end of a discharge pipe 30 which depends from the top wall of the chamber A and opens into the outlet 13. The deflecting baffle 28 restricts downward flow of the air stream and also deflects the grit and waste particles onto the upper surface of the stratifying slide 33. As the grit and waste particles move down the conical slide 33, the increasing surface area presented permits the particles to spread out and for each particle to come into contact with the slide rather than to remain piled on top of another particle. Consequently, when the solid particles cascade over the lower perimeter of the cone 33, as a film about one layer thick, the individual particles of grit (heavy) and of fines (light) are easily separated from each other by a cross current of air.

Most of the air which entered at 12 and made one or more circuits around the chamber 26, meanwhile flows up the channel 35 formed by the inner cylinder of the cyclone 22 surrounding the discharge pipe 30, by reason of less friction. It then moves down the annular channel 38 formed between the outer tank wall 39 and cyclone 22. The air takes this path because of the restriction formed by the relatively narrow gap 34 between the cone 33 and the deflecting baffle 28. Thus the bulk of the air sweeps down the channel 38 and through an annular sweep area or opening B between the cone 33 and a lower adjustable cone 41. The cone 41 may also be termed a conical baffle, a lower baffle, or, in general, baffle means. As a result, the cascading grit and waste particles are subjected to a cross-current of air which sweeps the lighter fines, oxidized scale and dust particles into the space between the cones 33 and 41 into the discharge stack 30 and over into the refuse collector. The heavier grit particles fall down into the lower chamber D through the gap at the lower periphery of the cone 41. To guard against possible grit loss into the air sweep, the cones 33 and 41 have different slopes so that the air sweep tends to expand into a zone C of reduced velocity near the apex portions of the cones. Any of the heavier grit particles accidentally swept in between the cones are not supported by this reduced velocity and consequently drop to the cone 41 where they slide back down through the sweep area B. As the grit descends into chamber D, any over-size waste particles that have escaped removal are caught on the screen 42. The screen 42 also serves to remove any oversize particles in the grit when it is first loaded into the hopper 14 through an opening 49 provided for that purpose.

The effectiveness of separation in the upper chamber A is dependent on having the proper velocity of the cross-current air sweeping into the gap between the cones 33 and 41. The necessary range of velocities will vary with the type of grit abrasive material used. This velocity must be great enough to carry the individual dust or scale particles out from among the grit particles so they will be swept up the cone 41 and out the pipe 30. On the other hand, this air velocity must not be great enough to pick up the grit particles themselves, as they must fall into the grit hopper 14. To adjust the air velocity, the lower cone 41 is raised or lowered to vary the width of the gap at the sweep area B between the two cones 33, 41. Thus, if a relatively heavy abrasive is used, such as steel grit having a mass of approximately 265 lbs./ft.$^3$, the cone or baffle 41 would be raised to decrease the gap and thereby achieve a relatively high sweep velocity. With a lighter abrasive, such as sand (approximately 100 lbs./ft.$^3$), the cone 41 would be lowered, thereby widening the gap and lowering the velocity of the air so it would not sweep the sand particles up the conduit 30 along with the scale, or debris. A suitable adjusting means for this purpose is illustrated in Figs. 1 and 3, which show the cone 41 adjustably mounted on a vertical shaft 45 by a sleeve 46 and adjusting screw 47. Of course, any other convenient means could be used. For certain abrasives, such as ground walnut shells (35 lbs./ft.$^3$), it may be desirable to remove the cone 41 completely to further reduce the sweep velocity.

Further control over the air sweep may be provided by an adjustable skirt 50 adjacent the lower end of the cyclone 22. In the illustrated apparatus, the skirt 50 is a cylinder of slightly larger diameter than the outer cylinder of the cyclone 22, and is maintained in an adjusted position by a series of tightening nuts 51. Raising the skirt 50 will tend to reduce the velocity of the air moving to the air sweep at the gap B. However, the principal control over the separating action at gap or sweep area B depends on the vertical adjustment between the cones 33 and 41, as will be explained more fully below.

In lower chamber D grit and oversize waste particles that escaped the air sweep fall to the screen 42. The correctly sized grit passes through the screen to the hopper 14 below, while the larger waste particles are caught on the screen and collect at its lower edge. The screen 42 also serves to remove any oversize particles in the grit when it is first loaded into the hopper 14 through a filling opening 49 provided for that purpose. The screen is sealed about its periphery by a rubber gasket 51a so that all the grit must pass through the screen before reaching the outlet 23 in the bottom of area E. To insure that the grit particles will pass quickly into the hopper 14, a suitable vibrator 52 may be employed to shake the screen. In the illustrated apparatus a pneumatic vibrator supplied by air line 53 is used, but it is clear that other types of vibrators, such as electrical or mechanical, may also be used to accelerate the flow of usable abrasive through the screen as well as concentrating the oversize particles 56 at door 54. A quick opening door 54 may be provided adjacent the lower edge of the screen 42. At intervals, these particles may be discharged directly out of the reclaimer through a wide-mouth tapered conduit 57 into a suitable receptacle (not shown). The door 54 may be mounted in a removable plate 58 to provide a suitable manhole for making any necessary adjustments to the lower cone 41 and skirt 50, mentioned above.

A feature of the present invention is the device F adjacent the outlet 23 which we prefer to term for convenience, an "anti-puffing device." The purpose of the anti-puffer F is to permit the reclaimed grit 10 to be safely discharged from the low pressure of the reclaimer to the positive pressure of the equalizer tank 16 leading into the air blast line. In practice, the equalizer tank is exhausted to atmospheric pressure and then rendered air tight before the dump valve 18 is opened. On opening the valve 18, the residual air pressure in the tank 16 puffs upwardly through the outlet 23 striking the grit in the outlet and carrying it upwardly into the reclaimer.

The anti-puffer F diverts this uprush of grit into contact with a batter plate 60, preventing the grit from striking the screen 42 or other interior parts and causing wear, or deflection to area B. This diversion of grit is accomplished by an inverted conical hood 62 which leads into a flow directing pipe 64. Preferably the pipe 64 and batter plate 60 are made of a resilient material, such as rubber, so that the kinetic energy of the impelled grit will be rapidly absorbed on contact. After impinging on the batter plate 60 the grit particles fall back into the hopper 14 as the pressures in the reclaimer and tank 16 equalize. To insure that the grit accumulating above the hood 62 will have free access to the outlet 23, the hood is spaced from the hopper by supports 66 to provide peripheral passages 68 leading down the inclined surface of the hopper wall.

In summary, the operation of the separator and reclaimer is as follows:

The powerful suction exerted through conduit 13 causes the grit and waste laden air stream to be introduced tangentially into the cyclone chamber 26 through the inlet 20. The air stream is impelled in a circular path with the grit and waste particles being thrown outwards by centrifugal force. At the sametime, the area of the chamber being much greater than that of the inlet pipe, the velocity of the air stream is reduced so that the material falls down the sides of the chamber to the deflecting baffle 28. The baffle 28 funnels the material onto the expanding conical surface of the stratifying slide 33 where the material is spread outwardly as it descends to the bottom edge of the slide. From the slide 33 the material falls in a thin cylindrical film surrounding the gap B formed by the slide and the adjustable cone 41. In the meantime the air stream separated from the material in the cyclone passes upwardly through the annular opening 35, then downwardly within the cylindrical space 38, and up through the gap 40 into the expansion zone C between the slide 33 and cone 41. As a result, the falling film of intermixed grit and waste particles are subjected to a cross current of air in the area B which sweeps the lighter waste particles up between the cones 33 and 41 and out the outlet conduit 13. The grit which is now cleaned of fine waste and dust particles falls onto the vibrating screen 42 where any large particles are removed, and the screened grit falls into the reclaimer hopper 14 for re-use. Any of the heavier particles which may have been carried by the air-sweep up into the space between the cones 33 and 41 will drop out of the air as it loses velocity in the expansion zone, and will slide back down the cone 41 into the hopper 14. From the hopper E, the clean grit may be emptied into the positive pressure of the equalizer tank 16, as desired. Any sudden uprush of grit caused by equalizing air pressures between the reclaimer and equalizer tank will be deflected by the anti-puffing device F at the resilient batter plate 60.

A particular feature of the operation just described is the unique control of the air sweep from both the upstream and downstream sides of the sweep area B. On the upstream side, the adjustable skirt 50 and the inturned flange 70 of the housing A form a restricted annular opening which determines the velocity of the air stream just ahead of the falling film of intermixed grit and waste. On the downstream side, the suction exerted through the conduit 13 insures a uniform vacuum throughout the gap area B immediately behind the falling film of intermixed materials. The effect of this uniform vacuum is to produce substantially uniform velocities in the sweep area 40, permitting maximum control over the separation of waste from the grit. By vertical adjustment of the cone 41, the degree of vacuum in the sweep area may be carefully controlled without detracting in any way from the uniform velocities possible in the sweep area B. As a result, an unusual degree of efficiency in the separation of materials according to their specific gravities can be achieved. In fact, the illustrated apparatus is so efficient that it is capable of removing the fines produced by a surface treating operation in a single pass through the device. The removal of these wear-producing particles before they can again pass along the grit hoses and through the blasting nozzles greatly increases the useful life of the surface-treating apparatus as well as effecting economies of operation.

Another advantage of the efficient operation of the illustrated apparatus is the unusually high rate of recovery of the used grit. This high rate results not only from the ability to maintain uniform sweep velocities in the gap area B, but also from the reduced exhaust velocity in the expansion zone C. In the first instance, accurate control of sweep velocity throughout the separation zone permits a particular sweep velocity to be established which is just sufficient to remove the fines, dust, and scale without removing grit particles. On the other hand, the overhead outlet and expansion zone C permit any grit particles which are accidentally swept along with the waste material to settle out of the discharging air stream and to return to the supply of reclaimed grit.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In an apparatus for separating and reclaiming a relatively dense comminuted material from an airborne intermixture of said material with a plurality of relatively less dense contaminating materials, the combination of a cyclone chamber having a tangential inlet for said airborne intermixture, means for separating said air and said intermixed materials into separate streams, and a stratifying annular frusto-conical slide on which said stream of separated intermixed materials fall through and beyond a restricted annular opening at the lower end of said cyclone chamber; means directing said air stream up away from the slide through the upper end of said cyclone chamber and for redirecting the air stream around said cyclone chamber to the lower end of said slide; an outlet conduit for said air extending from below the lower end of said cyclone chamber and below the lower end of said slide axially upwardly through said cyclone chamber and out through its upper end, so that a cross current of said air sweeps through said materials into said outlet conduit as they cascade off the bottom of said slide; and a baffle means providing a restricted entryway gap into said outlet conduit immediately adjacent the bottom of said slide and controlling the velocity of the air sweep uniformly over the gap area, whereby substantially all the relatively less dense contaminating materials may be swept free of said relatively dense materials and into said gap by said air sweep, while said dense materials fall below.

2. The combination of claim 1 wherein said outlet conduit is shaped so that the outer surface of its lower end forms said frusto-conical slide.

3. The combination of claim 1 wherein said cyclone chamber is provided with a cylindrical vertical upper portion, a shorter inner concentric portion of smaller diameter extending from the upper end thereof to a point below said inlet, and an annular horizontal portion connecting the upper ends of said concentric portions, said outlet conduit having a diameter still smaller than the diameter of said shorter inner concentric portion and extending concentrically through said cyclone, leaving an opening at said cyclone upper end between said outlet conduit and said inner portion through which said separated air stream leaves said cyclone.

4. The combination of claim 1 wherein said baffle means comprises a conical member coaxial with but of more gentle slope than said slide, so that as said air stream moves up and radially inwardly in said outlet conduit it moves into a larger-volume duct portion so that such said relatively dense materials as tend to be swept upwardly by said cross current may fall and slide out down said conical baffle as said air stream loses velocity in said larger-volume duct portion.

5. The combination of claim 4 wherein said lower baffle is adjustable vertically to vary the air velocity through said gap.

6. The combination of claim 1 wherein said cyclone has a cylindrical upper portion and a conical lower portion sloping inwardly toward said slide and spaced therefrom to provide said restricted annular opening, wherein said slide extends down therebeyond to a radius only slightly smaller than that of said cylindrical upper portion, and wherein a cylindrical skirt depends from said cyclone upper portion to approximately the lower end of said slide.

7. In an apparatus for separating and reclaiming a relatively dense comminuted material from an airborne intermixture of said material with a plurality of relatively less dense contaminating materials, the combination of a cyclone chamber having a tangential inlet for said airborne intermixture, means for separating said air and said intermixed materials into separate streams, and a stratifying annular frusto-conical slide on which said stream of separated intermixed materials fall through and beyond a restricted annular opening at the lower end of said cyclone chamber; means directing said air stream up and away from the slide through an annular upper end of said cyclone chamber and for redirecting the air stream around said cyclone chamber to the lower end of said slide; an outlet conduit for said air extending from below the lower end of said cyclone chamber and below the lower end of said slide axially upwardly through said cyclone chamber and out through its upper end, the outer surface of the lower portion of said outlet conduit constituting said slide, so that a cross current of said air sweeps through said materials into said outlet conduit as they cascade off the bottom of said slide; and a conical baffle spaced below said slide and of gentler slope, providing a restricted entryway gap into said outlet conduit immediately adjacent the bottom of said slide and controlling the velocity of the air sweep uniformly over the gap area, whereby substantially all the relatively less dense contaminating materials may be swept free of said relatively dense materials and into said gap by said air sweep, while said dense materials fall below.

8. In an apparatus for continuously separating comminuted materials of different specific gravities which enter said apparatus in suspension in an air stream, the combination of: a closed generally cylindrical housing, a generally cylindrical cyclone chamber within said housing and spaced therefrom to provide an air passage therearound and having a tangential inlet, an annular opening through its upper end, and a deflecting baffle sloping inwardly towards an opening in its lower end, an outlet pipe concentric with said cyclone chamber and extending from below the lower end thereof and up through said upper opening and through the top of said housing, the lower end of said outlet pipe being conical and sloping outwardly to form a stratifying slide extending through and beyond said baffle opening, whereby the comminuted materials separated in said cyclone chamber are deflected onto and fall off the bottom of said slide while said air stream freed of solids is forced through said upper opening and downwardly through said air passage between said housing and said cyclone chamber into said outlet pipe, performing thereby a cross current air sweep of said falling material that acts to blow lighter materials up into said outlet pipe while heavier materials fall into a hopper in the bottom of the housing.

9. The combination of claim 8 wherein said cyclone chamber is provided with a cylindrical vertical upper portion, a shorter inner concentric portion of smaller diameter extending from the upper end thereof to a point below said inlet, and an annular horizontal portion connecting the upper ends of said concentric portions, said outlet conduit having a diameter still smaller than the diameter of said shorter inner concentric portion to provide said annular opening therebetween.

10. The combination of claim 8 wherein a conical baffle coaxial with but of more gentle slope than said slide is spaced below said slide, so that as said air stream moves up and radially inwardly in said outlet conduit it moves into a larger-volume duct portion so that such said relatively dense materials as tend to be swept upwardly by said cross current may fall and slide out down said conical baffle as said air stream loses velocity in said larger-volume duct portion.

11. The combination of claim 10 wherein said lower baffle is adjustable vertically to vary the air velocity through said gap.

12. The combination of claim 8 wherein said cyclone chamber has a cylindrical upper portion and a conical lower portion providing said deflecting baffle sloping inwardly toward said slide to form said opening in its lower end, wherein said slide extends down therebeyond to a radius only slightly smaller than that of said cylindrical upper portion, and wherein a cylindrical skirt depends from said cylone chamber's upper portion to approximately the lower end of said slide.

13. The combination of claim 8 wherein a lower portion of said housing below said outlet pipe is provided with a sloping screen, means to vibrate said screen, an opening through said housing at the lower end of said screen, and a door normally closing said last-named opening.

14. The combination of claim 8 wherein the lower end of said housing is provided with a conical hopper with an opening at its lower end, valve means for opening and closing said hopper opening, an inverted conical hood spaced from and supported by said hopper above said opening, and an elbow pipe leading out from the upper end of said hood into said housing at right angles to the axis thereof, for prevention of puffing when said valve opens said hopper opening.

15. A low pressure device for continuously separating and reclaiming spent abrasive from an intermixture of said abrasive with air, dust, scale and other contaminants in a returning air stream in a vacuum circuit which comprises: a closed housing having an inlet passage for said air stream, an outlet for said abrasive, and a discharge passage for said air and contaminants; a cyclone chamber for separating said air stream and intermixed materials into separate streams; means directing said separate stream of intermixed materials to a stratifying slide; means directing said separate air stream into a cross current air sweep of said materials as they cascade off the slide to carry said contaminants up out of said discharge passage while said abrasive falls to said outlet, and anti-puffing means adjacent said outlet permitting said reclaimed abrasive to be emptied from said housing into an area of positive air pressure without the abrasive being blown back into said cyclone chamber, said anti-puffing means comprising a hood over the outlet having passages about its periphery for the abrasive, said hood including a conduit directed at a side of the housing, and a batter plate on the housing opposite said conduit.

References Cited in the file of this patent

UNITED STATES PATENTS

| | | |
|---|---|---|
| 150,503 | Affleck | May 5, 1874 |
| 1,661,299 | Peron | Mar. 6, 1928 |
| 1,761,627 | Hine | June 3, 1930 |
| 1,977,479 | Hebly | Oct. 16, 1934 |
| 2,003,141 | Dunfan | May 20, 1935 |
| 2,446,786 | Redhead | Aug. 10, 1941 |
| 2,645,345 | Dodds | July 14, 1953 |